April 16, 1963 A. SORG 3,085,617
APPARATUS FOR FORMING PLASTIC-COATED FILTER
PAPER WEBS FOR INFUSION PACKAGES
Filed Jan. 14, 1957
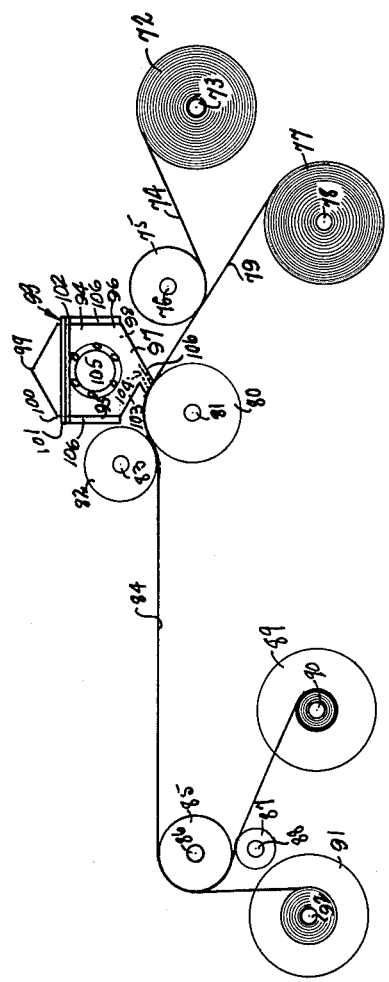
INVENTOR.
ADAM SORG
BY J. A. Grier
ATTORNEY.

United States Patent Office 3,085,617
Patented Apr. 16, 1963

3,085,617
APPARATUS FOR FORMING PLASTIC-COATED
FILTER PAPER WEBS FOR INFUSION PACKAGES
Adam Sorg, Glendale, N.Y., assignor, by mesne assignments, to Adam Sorg and Edwin V. Hadley, New York, N.Y.
Filed Jan. 14, 1957, Ser. No. 633,927
3 Claims. (Cl. 156—500)

The principal object of the invention is the provision of an extruding head for extruding a thermoplastic web directly upon a web of filter paper, backed up by a web of kraft or other paper, allowing the thermoplastic material to penetrate the filter paper and to enter the kraft paper or other paper in a capillary manner, chilling the webs, and the final step of mechanically separating the webs and thereby "pulling out" portions of the plastic from the filter paper to make the latter permeable to infusion fluids.

Another object of the invention is the step of extruding a thermoplastic web such as polyethylene directly upon a web of filter paper backed up by a web of kraft paper or the like having characteristics different from those of the filter paper, causing the thermoplastic material to penetrate the filter paper and at least some of it to enter the kraft paper in a capillary manner, the step of filling the webs after a predetermined time element sufficient to allow for this penetration, and the final step of mechanically separating the webs and thereby pulling out portions of the plastic from both webs and thereby producing two useful webs, one of which is permeable to infusion fluids.

Other objects and advantages of the invention will be apparent to those skilled in the art, upon a study of this specification and the accompanying drawings.

Heretofore in this art, the most extensively used materials for forming infusion packages, for example, tea bags, has been a filter paper carrying an all-over coating, or carrying an all-over pattern that usually comprised a series of diagonal lines usually equally spaced apart from one another. The plastic usually employed has been a vinyl compound with acetone or the like, as a solvent. However, it was a well known fact that when such patterns are impressed on the filter paper, either by printing or by said all-over coating, it has been extremely difficult to drive off all of the acetone or other solvent, even when the treated filter paper is run over heated drying rollers, repetitively. Any residual acetone can readily be detected by the professional tea taster, and the extra passes of the paper over the drying rollers adds to the cost of the resultant tea bag paper due to the extra handling, and the repetitive heating of the paper by the several passes makes the paper brittle and reduces its wet strength.

Referring to the drawing, which is given by way of example to illustrate the invention:

The FIGURE is a diagrammatic representation of apparatus for extruding a thermoplastic web onto a web of filter paper backed up by a web of kraft paper, and the subsequent separation of the two paper webs to make the combined filter paper thermoplastic web permeable to infusion fluids.

Referring now to the drawing, an extruding head 93 comprises a body 94 having double walled sides 95 and 96 having electrical heating elements (not shown) therein. The sides 95 and 96 are preferably formed integral with end walls 97 and 98. A removable top 100 has a dome 99, which may carry additional heat elements (not shown). The dome is held onto the body by matching flanges 101 and 102 on the body and on the dome respectively with a sealing gasket therebetween by suitable screws (not shown).

The extruder has a bottom wall 103 carrying an extension which is hollow inside, and communicating with the hollow and within a nozzle 106 is an elongated slot 104 that communicates with the interior of the extruder through said hollow. Spiral conveyor means (not shown) is provided in the extruder for impressing suitable pressures moving the thermoplastic material within the lower portion of the extruder body and forcing the thermoplastic material through the elongated slot 104 to form a thin thermoplastic sheet and deposit it on the moving paper web designated by the numeral 74 and backed up by a web 79 of kraft paper. One or more heating elements 106 may be mounted on the outer walls of the extruder, and they may be also thermostatically controlled.

The web 74 is led from a reel 72 of filter paper, which is supported for rotation on a shaft 73. The web 79 comes from a roll 77 which is supported for rotation on a shaft 78. These webs 74 and 79 pass under a roll 75, supported for rotation on a shaft 76. A roll 80 in the form of a hollow drum rotates on a hollow shaft 81 which supplies brine to the interior thereof. The two webs pass over the roll 80 and between it and the pressure roll 82 and as it passes beneath the nozzle 106 thermoplastic material is extruded onto the filter paper web, which is uppermost, and some of this molten material passes through the filter web and onto the kraft paper web. The chill roll 80 cools the thermoplastic and the combined webs 84 pass over a roller 85 supported for rotation on a shaft 86. The upper web 74 of the combination passes to the left of the roller 87, which turns on a shaft 88 and then passes on to a "take up" roll 91 carried on a shaft 92, and including a slipping clutch (not shown) such as is described above herein.

The web 79 of kraft paper separated from the combined web by roll 87 passes on to a takeup roll 89 carried on a shaft 90 and including a slipping clutch (not shown).

A modification of the above described arrangement contemplates the provision of a roll 80 which may be smaller in diameter than the one shown in the drawing and this may be heated in order to delay the setting of the thermoplastic material being extruded onto the surface of the filter paper web, the purpose of which would be to allow greater penetration of the thermoplastic material into the kraft paper web 79. In that case, the pressure roll 82 would be the hollow drum to which brine is supplied for chilling the paper and thermoplastic material and its shaft 83 would be hollow for the passage of fluid medium.

In carrying out the invention in this modified form the object is to retain the extruded thermoplastic material as near its tacky state as possible for a sufficient time element to insure the penetration of the filter paper by the plastic and the entering of the hot plastic into the web 79 of kraft paper. The separating of the webs 79 and 74 after they pass over the roll 85 effects the tearing out of some of the plastic from one web and thereby rendering the other web pervious to infusion fluids. The web of kraft paper with its plastic material embedded may be used for many other purposes.

Although I have herein shown and described by way of example one method of forming a web of filter paper particularly adapted for tea bags and carrying an adherent thermoplastic which is pervious to infusion fluids, many changes may be made in the arrangements herein shown and described within the scope of the following claims:

What is claimed is:
1. Apparatus for producing filter paper web having a broken heat sealing film thereon, comprising an extruding head adapted to contain a solid thermoplastic synthetic resinous material, a nozzle at the lower end of said head, said nozzle having a thin elongated slot, means for heating said head to sufficiently soften said material to cause it to flow under pressure, means for exerting said pressure on said material, a roller immediately below said slot, the upper face of said roller being substantially in contact with said slot, rolls on one side of said roller for feeding said paper between said head and said upper face so that said paper is in substantial contact with both said nozzle and upper face, a pressure roll in substantial contact with said upper face on the side of said roller opposite said feed roll, the area of contact of said pressure roll being spaced from said nozzle a sufficient distance to permit said material to become initially set, and a second roll on the other side of said roller for receiving said paper.

2. Apparatus according to claim 1 characterized in that the plane of said slot forms an acute angle to the paper at said one side of said roller.

3. Apparatus according to claim 2 characterized in that there are means for chilling said roller.

References Cited in the file of this patent

UNITED STATES PATENTS

| | | |
|---|---|---|
| 1,323,021 | Crowell | Nov. 25, 1919 |
| 1,663,954 | Respess | Mar. 27, 1928 |
| 1,758,502 | Crowell | May 13, 1930 |
| 2,094,074 | Lee et al. | Sept. 28, 1937 |
| 2,268,673 | Reynolds | Jan. 6, 1942 |
| 2,271,458 | Lionne | Jan. 27, 1942 |
| 2,293,246 | Fay | Aug. 18, 1942 |
| 2,351,498 | Fowler | June 13, 1944 |
| 2,414,937 | Elliott | Jan. 28, 1947 |
| 2,560,301 | Morrison | July 10, 1951 |
| 2,607,712 | Sturken | Aug. 19, 1952 |
| 2,715,088 | Gunning | Aug. 9, 1955 |
| 2,795,522 | Johns | June 11, 1957 |
| 2,842,473 | Oberly et al. | July 8, 1958 |
| 2,897,108 | Harwood | July 28, 1959 |